United States Patent [19]
Sola et al.

[11] Patent Number: 5,609,545
[45] Date of Patent: Mar. 11, 1997

[54] CONTROL SYSTEM FOR A SERVO ASSISTED GEARBOX

[75] Inventors: Cesare Sola, Valperga Caluso; Biagio Termine, Settimo Torinese; Massimo Seminara, Novara, all of Italy

[73] Assignee: Magneti Marelli S.p.A., Milan, Italy

[21] Appl. No.: 511,597

[22] Filed: Aug. 4, 1995

[30] Foreign Application Priority Data

Aug. 5, 1994 [IT] Italy .................. TO94A0653

[51] Int. Cl.$^6$ .................. B60K 41/28
[52] U.S. Cl. .................. 477/78
[58] Field of Search .................. 477/78, 109

[56] References Cited

U.S. PATENT DOCUMENTS

| | | | |
|---|---|---|---|
| 4,785,917 | 11/1988 | Tateno et al. | 477/78 |
| 4,848,529 | 7/1989 | Kurihara et al. | 477/78 |
| 4,945,481 | 7/1990 | Iwatsuki et al. | |
| 5,119,696 | 6/1992 | Yamaguchi | 477/109 |
| 5,184,577 | 2/1993 | Kato et al. | 477/109 |
| 5,272,632 | 12/1993 | Noguchi et al. | 477/109 |
| 5,462,499 | 10/1995 | Bullmer et al. | 477/109 |

FOREIGN PATENT DOCUMENTS

| | | |
|---|---|---|
| 0228899 | 7/1987 | European Pat. Off. . |
| 0388107 | 9/1990 | European Pat. Off. . |
| 0390423 | 10/1990 | European Pat. Off. . |
| 0490627 | 6/1992 | European Pat. Off. . |
| 0529117 | 3/1993 | European Pat. Off. . |
| WO9209449 | 6/1992 | WIPO . |
| WO9407706 | 4/1994 | WIPO . |
| WO9505951 | 3/1995 | WIPO . |

*Primary Examiner*—Dirk Wright
*Attorney, Agent, or Firm*—Sughrue, Mion, Zinn, Macpeak & Seas

[57] ABSTRACT

A control system for a servo-assisted automatic gearbox in which the gearbox control unit communicates by means of a data line with the engine management unit in such a way as to optimise the gear-change operation. In particular, the gearbox control unit transmits to the engine management unit, during the course of the various phases A, B, C, D, E of the gear-change operation, the target speed of rotation or desired torque and receives instantaneous information relating to the speed of rotation and delivered torque so as to be able to perform the clutch engaging and disengaging operations and the gear engaging and disengaging operations in an optimal manner.

12 Claims, 3 Drawing Sheets

CONTROL SYSTEM FOR A SERVO ASSISTED GEARBOX

BACKGROUND OF THE DESCRIPTION

The present invention relates generally to automatic gearboxes for motor vehicles, of the type in which gear engagement and selection, and clutch operation are all servo assisted. More specifically, the invention relates to an electronically controlled gearbox of the said type.

Automatic gearboxes for motor vehicles are known in the art in which the gear-changing operations are performed entirely by servomechanisms able to perform the engagement, disengagement and selection of the gears, as well as the engagement and disengagement of the clutch. The gear-change operation may be performed automatically by an automatic gear-change control circuit, for example on the basis of the speed of rotation of the engine and the pressure on the accelerator pedal, or alternatively may be performed on the basis of a manual control exercised by the driver. In this latter case it is known as semi-automatic operation.

Gearboxes known in the art have, however, disadvantages due to the non optimal management of the said servo-assisted devices during the gear-change operations. For example, sharp variations in the engine speed and/or drive torque can occur during the disengagement and engagement of the clutch, or noises and knocking in the operations of engaging and disengaging the gears.

SUMMARY OF THE INVENTION

The object of the present invention is that of providing a control system for an automatic gearbox which will permit satisfactory resolution of all the above-indicated problems.

According to the present invention this object is achieved by a control system for an automatic gearbox having the characteristics indicated in the claims which follow the present description.

BRIEF DESCRIPTION OF THE DRAWINGS

Further characteristics and advantages of the present invention will become apparent during the course of the following detailed description, given purely by way of non-limitative example, with reference to the attached drawings, in which.

DETAILED DESCRIPTION OF THE INVENTION

Figure 1:
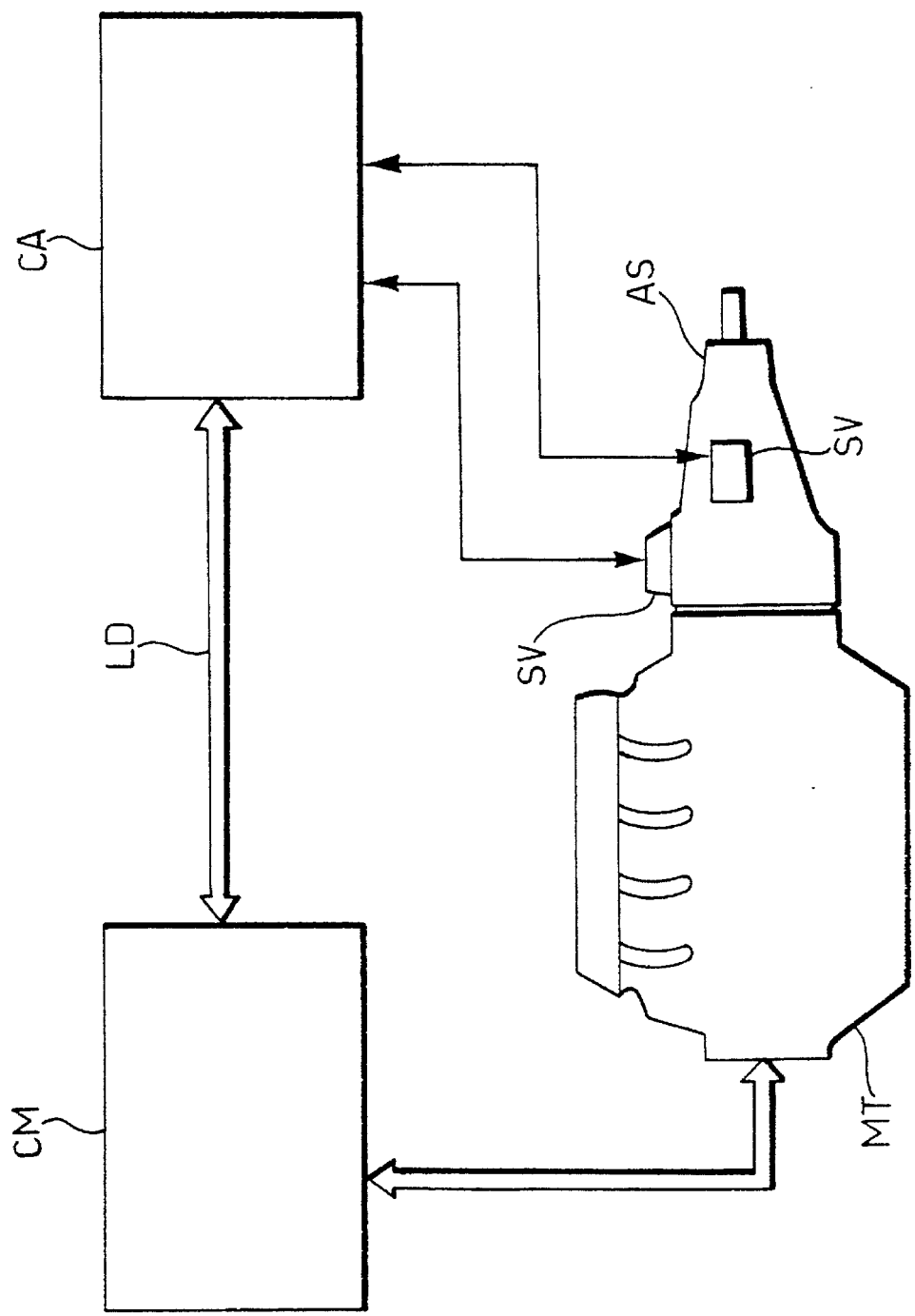
FIG. 1 is a schematic block diagram of a control system according to the present invention.

The system according to the present invention provides an electronic central control unit CA for the automatic gearbox AS (see FIG. 1) typically a microprocessor control unit, intended to control the servo-assisted devices SV operable to effect selection, engagement and disengagement of the gears and, if so programmed, the engagement and disengagement of the clutch (not illustrated).

It is envisaged for the system to be utilised in association with a heat engine MT also provided with an electronic central control unit CM. This does not in fact constitute a limitation to the use of the present invention in that these days the majority of heat engines intended for use on motor vehicles are provided with electronic engine management and control units. This tendency is about to extend also to diesel engines so that in the near future it is foreseeable that the very great majority of engines for motor vehicles will be provided with such electronic control units.

Essentially, the control system for the automatic gearbox AS according to the invention requires that during gear changes the electronic engine management unit CM of the heat engine MT controls the engine MT, under the control of the electronic control unit CA for the gearbox AS in terms of speed of rotation or delivered torque in order to avoid jerks or vibrations during gear changes.

To achieve this result data must be exchanged between the two control units (that is the engine management unit CM and the gearbox control unit CA) via a connection which allows the gearbox control unit CA to provide the engine management unit CM with requests for speed of rotation or torque and to receive in response information relating to the functioning of the engine MT. It is evident, therefore, that a bi-directional data communication line LD of sufficient capacity must be provided between the engine management unit CM and the gearbox control unit CA.

The dialogue between the two electronic control units CM and CA further ensures a greater level of security given that the two control units CM and CA have the possibility of operating an alternating control so that degradation of performance following a failure is more progressive. Moreover, the dialogue between the two control units CM and CA makes the communication control strategies more robust since, for example, control of the clutch (effected by the gearbox control unit CA) can automatically take account of the dynamic response of the heat engine MT which can vary during the life of the vehicle in dependence on wear or possible accidental and/or contingent factors.

Figure 2:
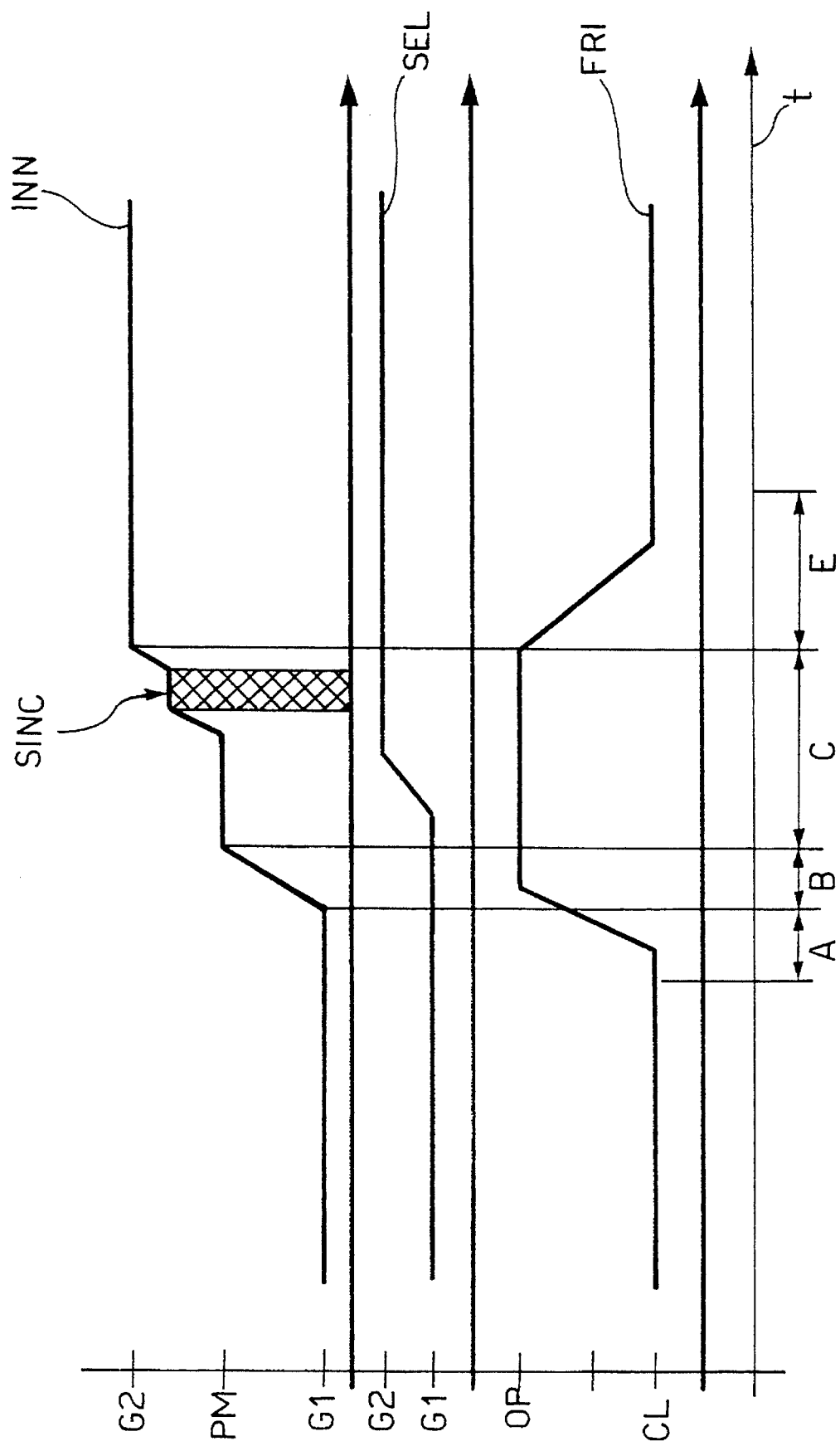
FIGS. 2 and 3 are timing diagrams illustrating the operation of the system according to the invention.

The various stages in the gear-changing operation will now be described in detail with reference to FIGS. 2 and 3 in which the state of the gearbox AS and the clutch are illustrated as a function of time t, and the corresponding exchange of data, or dialogue, between the two control units CM and CA is shown. These phases are fundamentally as follows.

A) Release of Torque

The gearbox control unit CA asks the engine management unit CM to reduce the torque delivered by the heat engine MT from an initial value, that is that of the torque delivered at the instant the request is made, down to zero according to a torque variation as a function of time t, provided always by the gearbox control unit CA. During this phase the gearbox control unit CA acts to disengage the clutch in dependence on the value of the torque delivered by the heat engine MT and communicated by the engine management unit CM instant by instant. This is visible on the clutch graph FRI in which can be seen the passage, during phase A, from the clutch engaged position CL to the clutch disengaged position OP.

B) Disengagement of the Gear

During this phase, which starts after the torque delivered by the engine has fallen to zero and the clutch has been disengaged, the gearbox control unit CA acts to disengage the previously engaged gear, indicated G1. This can be seen in the engagement graph INN in which can be seen the passage from the position G1 (previously engaged gear) to the neutral point PM in which no gear is engaged. During this phase the engine management unit CM continues to maintain the value of the torque delivered by the heat engine MT at zero, at the request of the gearbox control unit CA.

C) Actuation

During this phase the gearbox control unit CA provides the engine management unit CM with a target value for the engine speed, to be reached as quickly as possible, whilst providing for management of the actuation of selection, synchronisation and engagement of the new gear, indicated G2. As will be noted, during this phase the gearbox control unit CA provides for selection of the new gear G2, passing from the position G1 to the position G2 of the selection graph SEL. Subsequently, upon completion of the selection, the gearbox control unit CA provides for engagement of the new gear G2 as can be seen from the engagement graph INN in which passage from the neutral point PM to the position of engagement of the second gear G2 takes place. During this operation synchronisation takes place (represented in the engagement graph INN by the dark band SINC) by operation of the gearbox synchronizers in the gearbox AS. At the end of the phase C the new gear G2 has therefore been selected and subsequently engaged. During the whole of this phase the clutch remains disengaged. For the case of a gear box AS without synchronizers this phase will be described in more detail hereinbelow. (FIG. 3)

D) Engagement

This phase is specific to gearboxes without synchronizers (FIG. 3) in which the equalisation of the speed of rotation of the primary and secondary of the gearbox AS is ensured by direct control of the speed of rotation of the engine MT to which the primary is fixed for rotation, the clutch having been engaged as soon as the disengagement of the preceding gear G1 is completed. When the speed of rotation of the primary has reached the required speed, corresponding to the speed of rotation of the secondary, the gearbox control unit CA acts to engage the new gear G2 as indicated by the passage from position PM to the position G2 in the engagement graph INN.

E) Reinstatement of the Torque

During this phase the gearbox control unit CA requests that the engine management unit CM reinstate the torque delivered by the engine MT according to a torque variation which is a function of the time t. During this phase the gearbox control unit CA acts to engage the clutch on the basis of the torque values delivered by the engine MT provided, instant by instant, from the engine management unit CM. This can be seen in the clutch graph FRI (FIG. 2) which returns to the engaged position CL. In the case of gearboxes without synchronizers, finding the clutch already fully engaged at the commencement of this phase (FIG. 3) only reinstatement of drive torque to the wheels takes place, managed exclusively by the engine control unit CM which is provided by the gearbox control unit CA with the timing law of increase of delivered torque to follow.

Figure 3:
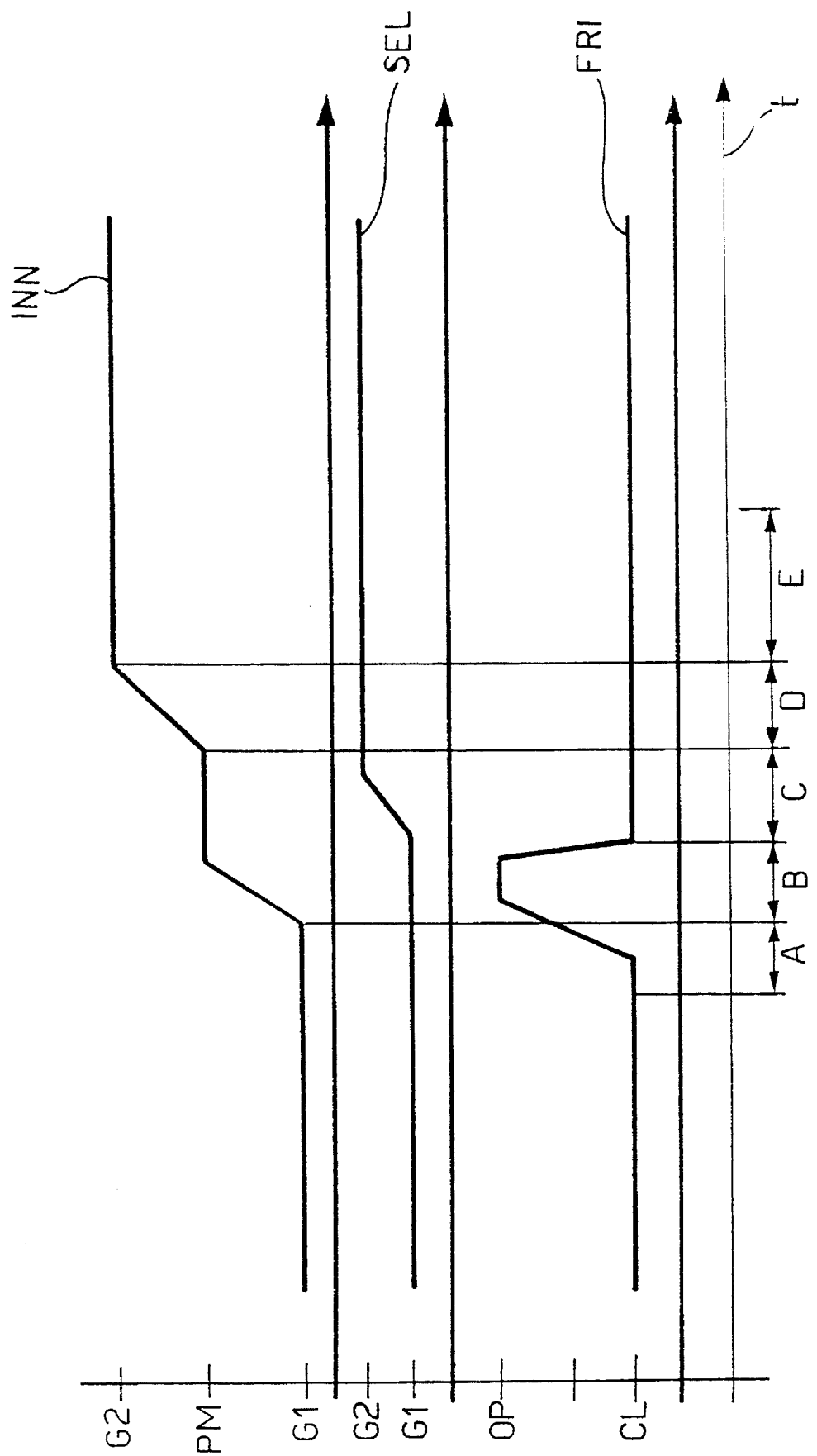

As can be seen from the graph of FIG. 3, in the case of gearboxes AS having no synchronizers there are several differences in the gear-change operation. In particular, at the end of phase B it will be noted that the clutch FRI is engaged rapidly as soon as the disengagement of the preceding gear G1 has been completed. This ensures that during phase C only selection of the new gear G2 takes place, and that this selection takes place with the clutch CL engaged as can be seen from the graph.

There is, moreover, an additional phase D, already described hereinabove, in which the operation of engagement of the new gear G2 takes place. In this phase D the engagement of the new gear G2 takes place with the clutch CL engaged which is different from the preceding case (gearbox AS having synchronizers) in which the engagement of the new gear G2, in the second part of the phase C, takes place with the clutch OP disengaged. This serves to allow the engine management unit CM to make the speed of rotation of the primary of the gearbox AS substantially identical to the speed of rotation of the secondary.

As is known, in fact, the secondary of the gearbox AS is driven to rotate by the drive wheels of the vehicle, when the gear is disengaged, so that it is, naturally, necessary to act on the speed of rotation of the primary. This would not be possible if the primary were disengaged from the heat engine MT by disengagement of the clutch. With the clutch engaged the primary is, on the other hand, fixed for rotation with the drive shaft of the heat engine MT so that its speed of rotation can be controlled so as to be identical with that of the secondary. The speed of rotation is controlled by the gearbox control unit CA which provides the engine management unit CM with the target variation in the speed of rotation to be followed.

As is apparent from the preceding discussion the system according to the invention requires the exchange of information in order to be able to operate. More specifically, the information required by the gearbox control unit CA is:

instantaneous torque delivered by the engine MT, instantaneous speed of rotation of the engine MT and, speed of rotation of the secondary of the gearbox AS.

The speed of rotation of the secondary is proportional to the speed of rotation of the vehicle's drive wheels (road wheels), in substance the speed of the vehicle itself, and is therefore information already present and available within the vehicle. The other two items of information, on the other hand, that is the instantaneous torque delivered and the instantaneous speed of rotation of the heat engine MT are available from the engine management unit CM.

In particular, the instantaneous speed of rotation of the engine is detected directly, for example by means of a phonic wheel, whilst the instantaneous delivered torque is processed by the engine management unit CM on the basis of information detected by means of various sensors disposed on the heat engine MT. This processing is typical of current engine management units CM, so this information, too, is available from the engine management unit CM.

The gearbox control unit CA, on the other hand, communicates the following information to the engine management unit CM:

gear change phase (instants of commencement and termination)

target speed of rotation, target delivered torque, identity of engaged gear.

As can be seen from the preceding discussion, not all this information is essential to the operation of the system. In fact, the system would be able to operate even if the gearbox control unit CA were limited to providing the engine management unit CM, depending on the phase, the target speed of rotation or, alternatively, the target torque to be reached in dependence on phase. The further information, such as the instants commencement and end of the various phases A, B, C, D, E and the identification of the gear to be selected comprise additional redundancy in the system, conferring on it an improved robustness. This ensures that in the case of failure, for example if the communication line LD does not permit a correct transmission of the variations and target values in the speed of rotation or torque, the system can continue to function even if with a non optimum performance, thanks to the said additional information which puts the engine management unit CM in a position to perform the operations corresponding to the various phases, even if in an approximate manner, in that it is not controlled directly by the gearbox control unit CA.

The system can also act without the operations of opening (disengaging) and subsequent closure (engaging) of the clutch: in fact the reduction of the torque delivered by the engine to the target torque (down to zero) makes it possible to disengage the previously engaged gear without disengaging the clutch. The introduction of the new gear is possible when the speed of rotation of the primary shaft, multiplied by the number of teeth of the new gear, equals the speed of rotation of the secondary shaft multiplied by the number of teeth of the secondary gear.

The system according to the present invention therefore makes it possible to obtain significant operating advantages with respect to prior art automatic gearboxes. These advantages are achieved, in particular, for example, in the case of operation on road surfaces having low adhesion. In cases of this type, in fact, it is particularly important to manage the phase E of reinstatement of the torque for the purpose of avoiding skidding of the drive wheels. Possibly, the progress of the phase of reinstatement of the torque, which the control unit CA assigns to the engine management unit CM, can vary in an automatic manner for example on the basis of a drive behaviour simulation programme, or following a manual control, to adapt itself to the low adhesion on the road surface.

The system can moreover be configured in such a way as to allow function of the gearbox even if a failure, even a serious failure, of an element of the system such as the control lever takes place.

Naturally, the principle of the invention remaining the same, the details of construction and the embodiments can be widely varied with respect to what has been described and illustrated, without by this departing from the ambit of the present invention.

What is claimed is:

1. A control system for an automatic gearbox associated with a heat engine of a vehicle, including actuator devices operable to perform the operation of:

gear engagement and disengagement, gear selection, clutch engagement and disengagement, the said heat engine including first processor means operable to control at least one operating parameter of the said heat engine, and including second processor means, operatively connected to the said actuator means, wherein the said second processor means are connected in such a way as to exchange information with the said first processor means, and are configured in such a way as to:

control the said actuator means to perform a plurality of operations to effect a gear change of the said automatic gearbox, transmit to the said first processor means, during at least part of the said operations, predetermined information for the purpose of controlling the said at least one operating parameter of the said heat engine, and receive, from the said first processor means, detected information relating to the said at least one operating parameter of the said heat engine, wherein the said at least one operating parameter comprises the torque delivered by the said heat engine, and wherein another operating parameter comprises the speed of rotation of the said heat engine, wherein the said plurality of operations, operable to effect a gear-change, comprise:

disengagement of a first gear, selection of a second gear, engagement of the said second gear, and wherein the said second processor means are configured in such a way as to perform the following operations:

disengagement of the said first gear after having reduced the said delivered torque substantially to zero, and, subsequently:

transmission of predetermined information to the said first processor means for the purpose of modifying the said speed of rotation of the said heat engine in such as a way as substantially to equalise the speed of rotation of a primary shaft of the said gearbox with the speed of rotation of a secondary shaft of the said gearbox, reception of detected information relating to the said speed of rotation from the said first processor means selection of the said second gear engagement of said second gear on the basis of the said detected information, maintaining, at the same time, the said delivered torque substantially at zero.

2. A system according to claim 1, wherein the said plurality of operations to effect a gear-change further include:

clutch disengagement, clutch engagement.

3. A system according to claim 1, wherein the said second processor means are configured in such a way as to:

transmit predetermined information to the said first processor means for the purpose of reducing the said torque delivered by the said heat engine substantially to zero, receive detected information relating to the said delivered torque from the said first processor means, and disengage the said clutch during the said torque reduction on the basis of the said detected information.

4. A system according to claim 3 in which the said automatic gearbox is provided with synchronizers, wherein the said second processor means are configured in such a way as to perform the following operations in chronological order:

disengagement of the said first gear after having reduced the said delivered torque substantially to zero, selection of the said second gear and engagement of the said second gear, at the same time maintaining the said delivered torque substantially at zero.

5. A system according to claim 2, in which the said automatic gearbox is not provided with synchronizers, wherein the said second processor means are configured in such a way so as to perform the following operations:

disengagement of the said first gear after having reduced the said delivered torque substantially to zero and after having disengaged the said clutch, engagement of the said clutch after having disengaged the said first gear, and, subsequently:

transmission of predetermined information to the said first processor means for the purpose of modifying the said speed of rotation of the said heat engine in such a way as substantially to equalise the speed of rotation of a primary shaft of the said gearbox with the speed of rotation of a secondary shaft of the said gearbox, reception of detected information relating to the said speed of rotation from the said first processor means, selection of the said second gear, engagement of the said second gear on the basis of the said detected information, at the same time maintaining the said delivered torque substantially at zero.

6. A system according to claim 4, wherein the said second processor means are configured in such a way as to:

transmit predetermined information to the said first processor means for the purpose of increasing the said delivered torque receive detected information relating to the said delivered torque from the said first processor means, and engage the said clutch, if previously disengaged, during the said torque increase on the basis of the said detected information.

7. A system according to claim 1, wherein the said predetermined information represents a variation with time t of the said at least one operating parameter.

8. A system according to claim 7, wherein the said detected information is constituted by a plurality of values of the said at least one operating parameter detected in a periodic manner at closely spaced time intervals.

9. A system according to claim 8, wherein the said predetermined information represents a gradual increase in the said delivered torque for the purpose of avoiding juddering or skidding of the drive wheels of the said vehicle with respect to a road surface.

10. A system according to claim 9, wherein the said second processor means are configured such as to modify the said gradual increase of the said torque for the purpose of avoiding the said juddering or skidding.

11. A system according to claim 10, wherein the said second processor means are configured to modify the said gradual increase of the said torque on the basis of a predetermined programme of drive behaviour simulation.

12. A system according to claim 1, in which the said first processor means are an electronic microprocessor control unit for management of the said heat engine, wherein the said second processor means comprise an electronic microprocessor control unit for the management of the said automatic gearbox, and in that it includes a digital data communication line operable to allow bi-directional communication between the said electronic control units.

* * * * *